United States Patent [19]

Curry et al.

[11] Patent Number: 4,766,560

[45] Date of Patent: Aug. 23, 1988

[54] PARALLEL/PIPELINED ARITHMETIC VARIABLE CLOCK FREQUENCY SYNTHESIZER

[75] Inventors: Douglas N. Curry; Donald J. Curry, both of Menlo Park, Calif.

[73] Assignee: Xerox Corporation, Stamford, Conn.

[21] Appl. No.: 812,541

[22] Filed: Dec. 23, 1985

[51] Int. Cl.[4] .............................................. G06F 1/02
[52] U.S. Cl. .................................... 364/721; 364/718
[58] Field of Search ...................... 364/721, 718, 702; 328/14; 379/418

[56] References Cited

U.S. PATENT DOCUMENTS

| 3,772,681 | 11/1973 | Skingle .................................... 328/14 |
| 3,973,209 | 8/1976 | Nossen et al. ........................... 328/14 |
| 4,134,072 | 1/1979 | Bolger .................................... 364/721 |
| 4,328,554 | 5/1982 | Mantione ................................ 364/721 |

OTHER PUBLICATIONS

Tierney, J., "Digital Frequency Synthesizers", Frequency Synthesis: Techniques and Applications, edited by J. Gorski-Popiel, IEEE Press, 1975, pp. 121-149.

Primary Examiner—Gary V. Harkcom
Assistant Examiner—Tan V. Mai

[57] ABSTRACT

An arithmetic frequency synthesizer comprises one or more parallel/pipelined systolic computing arrays for performing parallel, recursive accumulation functions. Existing very large scale integrated circuit technology may be used to fabricate such arrays. Such a frequency synthesizer may be utilized, for example, to provide scan non-linearity correction, motor hunt compensation and/or polygon signature correction for laser scanners.

5 Claims, 7 Drawing Sheets

PARALLEL/PIPELINED ARITHMETIC VARIABLE CLOCK FREQUENCY SYNTHESIZER

FIELD OF THE INVENTION

This invention relates to arithmetic variable clock frequency synthesizers and, more particularly, to high speed combinational logic for them. In even greater detail, the present invention pertains to parallel pipelined combinational logic for frequency synthesizers of the foregoing type, and especially to very large scale integrated (VLSI) circuit implementations of such logic.

BACKGROUND OF THE INVENTION

Digital frequency synthesis processes have been developed for producing variable frequency sinusoids and for generating variable frequency pulse trains or "clocks." See, for example, Tierney, J., "Digital Frequency Synthesizers," *Frequency Synthesis: Techniques and Applications*, Edited by J. Gorski-Popiel, IEEE Press, 1975, pp. 121-149. Although there are conceptual similarites among these processes, there are significant functional and implementational differences between them, so the following discussion will focus on clock frequency synthesizers.

Some variable clock frequency synthesizers operate by dividing a time dependent factor, N, into a stable reference clock frequency, $f_r$, thereby generating an output clock at a frequency $f_o$, which is given for any specific value of N by:

$$f_o = f_1/N \quad (1)$$

These divider-type synthesizers typically are relatively simple and inexpensive because the divide function can be performed by a counter which issues a single output pulse for each sequence of N reference pulses counted. Unfortunately, however, they are handicapped by the inversely proportional relationship of their output clock frequency, $f_o$, to the value of their frequency controlling variable, N. That limits their utility, not only by causing them to have non-linear frequency resolutions, but also by concentrating the great majority of their frequency generating capacity (i.e., the frequencies which are more finely resolveable) at the lower end of their output frequency spectra.

Arithmetic variable clock frequency synthesizers inherently have linearly resolveable output frequency spectra, so they generally are favored for applications calling for broad band frequency control. Such a synthesizer conventionally includes an accumulator for recursively accumulating a binary word of predetermined bit length, R, and time dependent value, N, at a stable reference clock frequency, $f_r$. Consequently, the most significant bit (MSB) of the word accumulated by the accumulator oscillates at a variable clock frequency, $f_o$, which is given for any specific value of N within the range $-2^{R-1} \leq N < 2^{R-1}$ by:

$$f_o = f_r(N/2^{R-1}) \quad (2)$$

Equation (2) suggests that the length, R, of the word being accumulated may be increased to enhance resolution of this type of synthesizer. As a general rule, however, the maximum permissible reference frequency, $f_{r(max)}$, for an arithmetic frequency synthesizer drops as the length of its accumulator is increased because the time allowance that is required for all necessary carries to propogate sequentially from the least significant bit (LSB) to the MSB of the word being accumulated is directly dependent on the length of the word (i. e., the accumulatorlength).Therefore, designers of these synthesizers often have to make a difficult tradeoff decision between frequency resolution, on the one hand, and high frequency cut-off limit, $f_{o(max)}$, on the other.

SUMMARY OF THE INVENTION

In accordance with the present invention, an arithmetic frequency synthesizer comprises one or more parallel/pipelined systolic computing arrays for performing parallel, recursive accumulation functions, thereby significantly increasing the range of frequencies which can be synthesized while retaining relatively fine frequency resolution. Existing VLSI circuit technology may be used to fabricate such arrays. Such a frequency synthesizer may be utilized, for example to provide scan non-linearity correction, motor hunt compensation and/or polygon signature correction for laser scanners.

BRIEF DESCRIPTION OF THE DRAWINGS

Still other objects and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with specific reference to certain illustrated embodiments, it is to be understood that there is no intent to limit it to those embodiments. On the contrary, the aim is to cover all modifications, alternatives and equivalents failing within the spirit and scope of the invention as defined by the appended claims.

Figure 1:
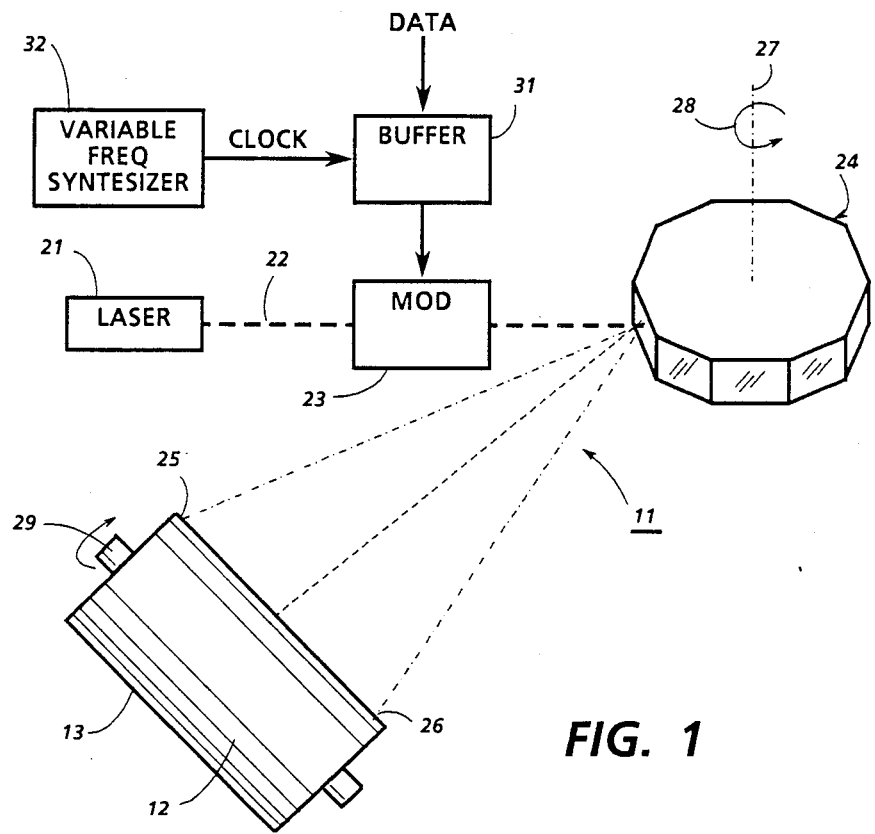
FIG. 1 is a simplified schematic of a printer having a raster output scanner with which the present invention may be employed to advantage to provide pixel placement compensation.

Turning now to the drawings, and at this point especially to FIG. 1, there is a printer (shown only in relevant part) having a generally conventional laser raster output scanner 11 for printing an image on a photosensitive recording medium 12, such as a photoconductively coated xerographic drum 13. In keeping with standard practices, the scanner 11 comprises a laser 21 for supplying a light beam 22, a modulator 23 for intensity modulating the laser light beam 22 in accordance with a serial stream of input data samples, and a multi-faceted reflective polygon 24. An image is printed by causing the intensity modulated laser beam 22 to expose the recording medium 12 in accordance with a predetermined raster scanning pattern. To that end, the polygon 24 is unidirectionally rotated at a relatively high speed (by means not shown) about its central axis 27, as indicated by the arrow 28, for cyclically sweeping the modulated laser beam 22 in a transverse or "fast scan" direction (i. e., from a start of scan position 25 to an end of scan position 26) relative to the recording medium 12. Furthermore, the drum 13 is unidirectionally rotated simultaneously at a relatively slow, synchronous speed (by means also not shown) about its longitudinal axis, as indicated by the arrow 29, to advance the recording medium 12 in an orthogonal cross-line or "slow scan" direction relative to the polygon 24, thereby causing the fast scan, scan line sweeps of the light beam 22 to be displaced from one another on the recording medium 12 by a predetermined scan pitch distance.

As is known, the quality of the image produced by a laser printer of the foregoing type is largely dependent upon the precision with which the scanner 11 positions individual picture elements ("pixels") on the recording medium 12. For that reason, provision (not shown) usually is made for supplying high quality printers with a large number of input data samples for each pixel which is to be printed. Moreover, such printers customarily include a scan buffer 31 or the like for temporarily storing the data samples, so that the rate at which the samples are fed to the modulator 23 can be adjusted under the control of clock pulses supplied by a variable clock frequency generator 32, such as a variable clock frequency synthesizer.

However, even when a variable frequency control clock is employed, there are unavoidable pixel positioning errors because an alignment tolerance of ± one clock pulse period is needed to account for the possible time lag between the detection of a start of scan and the subsequent clock pulse transition which establishes the timing reference. The necessary timing tolerance, and the pixel positioning errors attributable thereto, may be reduced by increasing the clock pulse frequency, but that is a practical approach only if the frequency generator 32 can supply the higher frequency clock pulses while still providing adequate frequency resolution to compensate for pixel positioning errors caused by (1) variations in the angular rotational velocity of the polygon 24 ("motor hunt"), (2) facet dependent changes in the angular velocity at which the light beam 22 is swept across the recording medium 12, ("polygon signature"), and (3) polygon angle dependent variations in the linear velocity at which the light beam advances across the recording medium 12 ("scan non-linearity").

Polygon signature errors are measureable and are essentially invariant as a function of time, so appropriate correction factors for the different facets of the polygon 21 may be stored in a suitable memory (not shown), thereby permitting them to be retrieved under program control to compensate for such errors on a facet-by-facet (i. e., scan line-by-scan line) basis. Likewise, scan non-linearity errors are predeterminable and substantially time invariant, so they also are amenable to program controlled compensation. Scan nonlinearity errors, however, vary at a relatively high rate as a function of the angular rotation of the polygon 21, so the compensating correction factor for them must be updated and changed several times during each scan. Motor hunt errors are unique because they tend to vary relatively slowly as a function of time. Consequently, the correction factor for them typically is dynamically computed and updated, preferably at least one per revolution of the polygon 21.

For a more detailed discussion of polygon signature and motor hunt error computation and correction, reference is made to U.S. patent applications of Douglas N. Curry, which were filed on 5/29/84 under Ser. Nos. 614,928 and 615,002 for "Polygon Signature Correction" and "Raster Scanner VariableFrequency Clock Circuit," now U.S. Pat. Nos. 4,622,593 and 4,639,789, respectively. As will be seen, the above-identified applications, which are hereby incorporated by reference, provide a practical alternative to one of the potential applications of this invention because they teach that occasional pulses may be deleted from a clock pulse train to compensate for polygon signature and/or motor hunt errors. Although that concept involves distinctly different operating principles than those of the present invention, it is an attractive pixel placement compensation technique because it is compatible with employing a high frequency clock pulse generator for reducing the aforementioned timing alignment tolerance and the pixel positioning errors caused thereby.

Figure 2:
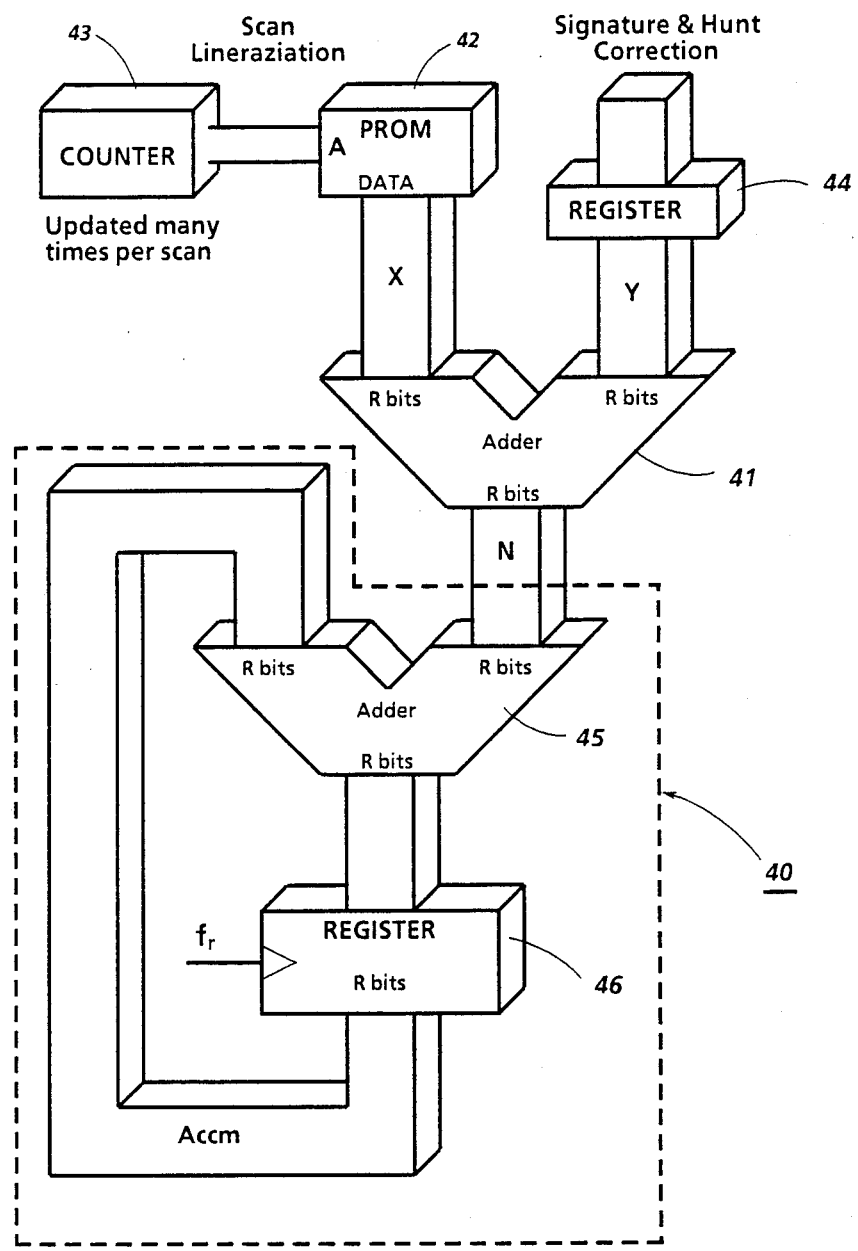
FIG. 2 is a basic block diagram of a more or less conventional arithmetic frequency synthesizer which is configured to perform pixel placement compensation for the printer shown in FIG. 1.

Referring to FIG. 2, there is a relatively conventional R-bit long, dual input port accumulator 40 to illustrate the arithmetic clock frequency synthesis principles upon which this invention is based. Two different R-bit long input words, which have time dependent values X and Y (where, X and Y are each $<2^{R-1}$), respectively, are provided for incrementing the accumulator 40, so there is an adder 41 for summing those two words to produce a single R-bit long sum word having a time variable value N (where, $2^{R-1} \leq X+Y < 2^{R-1}$) for application to the accumulator 40. As illustrated, X is the time dependent value of a word which is read out of a programmable read only memory (PROM) 42 under the control of a program counter 43 to provide scan non-linearity compensation for the scanner 11 (FIG. 1). Y, on the other hand, is the time dependent value of a word which is fed out of a register 44 to provide motor hunt and polygon signature compensation. Therefore, Y typically is updated and, if required, changed once per scan, while X is updated and changed many times during each scan.

While pixel placement compensation for laser scanners is an important application for variable clock frequency synthesizers, it will be apparent that there are other applications for such devices. For example, Y could be selected to establish a desired carrier frequency, and the X could then be varied to frequency modulate that carrier as a function of time. Indeed, input ports can be added to or removed from the accumulator 40 as required to compute N as a function of any arbitrary number of variables, so it will be understood that N may be more generally described as being the value of a R-bit long input word representing the sum of one or more time dependent variables.

The accumulator 40 comprises a R-bit long adder 45 which has its output coupled to a R-bit long register 46 which, in turn, is clocked at a reference frequency, $f_r$. One input of the adder 45 is coupled to the output of the adder 42 to receive a R-bit long input word having a value $N_t$ at a given time t, and the other input of the adder 45 is coupled to the output of the register 46 to receive a R-bit long word having a previously accumulated value Accm$_t$ at the given time t. The adder 45 sums those two words to produce a R-bit long sum word having a value Accm$_t$+N$_t$, plus a carry. The carry is ignored, but the newly accumulated sum word, Accm$_t$+N$_t$, (for convenience, words are sometimes identified herein by their values) is loaded into the register 46, so it is fed back to the input of the adder 45 after a delay of one reference clock period, Δt, to be summed with the next input word, N$_{t+\Delta t}$. Consequently, the accumulation process periodically repeats at the reference frequency, f$_r$. As will be appreciated, the accumulator 40 rolls over (i.e., produces an output carry) each time the accumulated word reaches a value of $2^R$. Therefore, the value, Accm$_t$, of the output word from the accumulator 40 (i. e., the word appearing at the output of the register 46) at any given time t can be expressed in generalized terms as being:

$$\text{Accm}_t = (\text{Accm}_{t-\Delta t} + N_{t-\Delta t}) \text{Mod} 2^R \quad (3)$$

Figure 3:
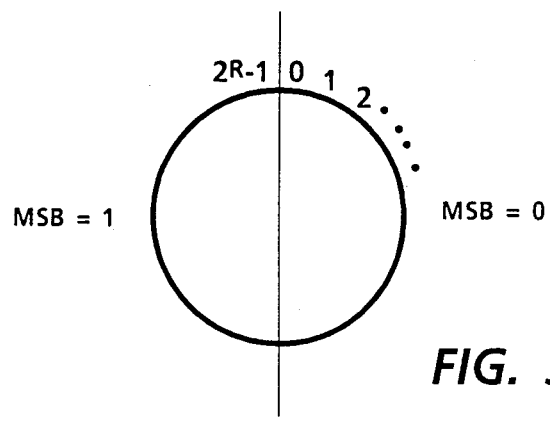
FIG. 3 is a unit circule which illustrates the fundamental operating principles of arithmatic frequency synthesizers.

Turning to FIG. 3, it will be evident that all possible values of any R-bit long binary number can be mapped onto a unit circle, starting for convenience with the zero ($2^R$) value at the top of the circle (i.e., the 12 o'clock position) and then mapping progressively increasing values onto the circle in a clockwise direction. An accumulation process then causes the value of the accumulated word to orbit around this unit circle, so the MSB of the accumulated word oscillates between a low ("0") and a high ("1") logic level as the accumulated word value shifts back and forth between the right and left-hand halves, respectively of the unit circle. It, therefore, follows that the upper output frequency limit, f$_{o(max)}$, of an arithmetic variable clock frequency synthesizer is reached when N equals $2^{R-1}$, because the accumulated word value oscillates between diametrically opposed points on the unit circle if it is incrementally increased by that amount at the reference frequency, f$_r$. Momreover, it also follows that there are a total of $2^{R-1}$ linearly resolveable output frequencies at which the logic level of the MSB of the accumulated word may oscillate. Thus, it will be apparent that the output frequency, f$_o$, of an arithmetic variable clock frequency synthesizer may be controlled with a relatively high degree of precision as a function of N, especially if R is selected to be a relatively large number.

As previously mentioned, the carry propagation time of conventional accumulators, such as the accumulator 40 (FIG. 2), has required designers of prior arithmetic variable frequency clock synthesizers to tradeoff frequency resolution to increase the high frequency cut-off limit, f$_{o(max)}$, of the synthesizer, and vice-versa To overcome that design constraint, the present invention provides an arithmetic frequency synthesizer having one or more parallel/pipelined systolic computing arrays for computing the MSB's of a plurality of R-bit long recursively accumulated words in parallel at a submultiple of the reference clock frequency, so that the MSB's of the accumulated words can be read out in series from the synthesizer at the reference clock frequency to generate finely resolved, variable clock frequency, f$_o$. More particularly, the systolic array or arrays compute the MSB's for $2^{k+c}$ words in parallel (where k is an integer value for describing the parallel capacity of each array in base two notation, and c equals the base 2 log of the number of arrays), so the arrays are clocked at a frequency, f$_s$=f$_r$/$2^{k+c}$. All carries required to compute the MSB's are pipelined, with the result that the period, ΔT, of the systolic clock, f$_s$, need only be sufficientl long to accommodate a single bit carry, regardless of the bit length, R, of the words being accumulated. Consequently, the reference clock frequency, f$_r$ can be selected to establish the high frequency cut-off limit of the synthesizer, f$_o$(max)=f$_r$/2, substantially independently of its frequency resolution. The accumulation process is carried out at the systolic clock frequency, s.

Figure 4:
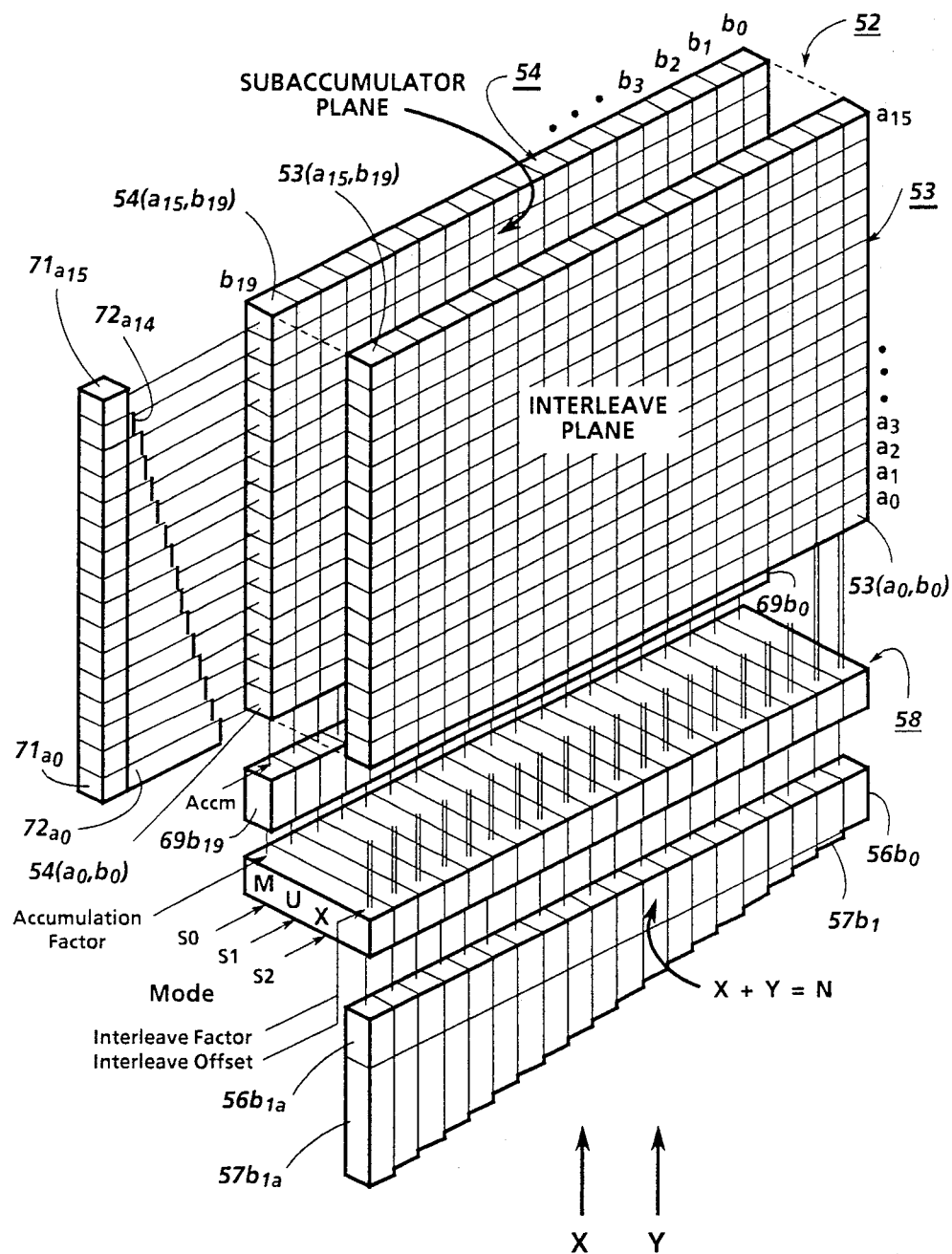
FIG. 4 is a simplified schematic diagram of a systolic computing array and its input/output (I/O) interfaces.

To carry out the present invention, as shown in FIG. 4, there is a dual plane, parallel/pipelined, systolic computing array 52 having an interleave plane 53, which contains a 16×20 array of identical interleave subcells 53(a$_0$, b$_0$) . . . 53(a$_{15}$, b$_{19}$), and a subaccumulator plane 54, which contains an 16×20 array of identical subaccumulator subcells 54(a$_0$, b$_0$) . . . 54(a$_{15}$, b$_{19}$). Although 54(a$_0$, b$_0$) cannot be seen in this view, it will be understood that a subaccumulator index a$_i$ (where i=0, 1, 2 . . . $2^k-1$) indexes the interleave and subaccumulator subcells from the bottom to the top of the array 52, and a bit place value index b$_j$ (where j=0, 1, 2 . . . R−1) indexes them from the right-hand (LSB) side of the array 52 to its left-hand (MSB) side. Consequently, any given subcell within either the interleave plane 53 or the subaccumulator plane 54 of the arry 52 is uniquely identifiable by its subaccumulator and bit place value index, (a$_i$, b$_j$). As will be appreciated, the horizontal or "b" dimension of the array 52 is determined by the length, R, of the word being accumulated, while its vertical or "a" dimension is determined by the parallel computing power of the array 52. The parallelism of the array 52 is described in detail hereinbelow, so it will suffice for the moment to note that it preferably is increased or decreased in powers of two (e. g., k+c=4 for a single systolic array synthesizer, 5 for a dual array synthesizer, or 6 for a synthesizer having four systolic arrays.)

The frequency synthesizer 51 (FIG. 7) is initialized (by means not shown) to ensure that all bits within all of its stages are initially reset to a low ("0") logic level. Following the initialization process, R bit long (e.g. twenty bit) input words of time varying value N begin to flow into the systolic array 52. In the illustrated embodiment, each of the input words has a certain value, N$_T$, because it is determined at a fixed point in time by the sum of the then current values, X$_T$ and Y$_T$, of the variables X and Y, respectively. Moreover, successive words N$_T$, N$_{T+\Delta T}$, N$_{T+2\Delta T}$. . . may be supplied to update the value of N at a rate up to the frequency, f$_s$, of the systolic array clock.

Assuming that the system reference frequency, f$_r$ (i.e., the rate at which MSB's are read out as more fully described hereinbelow) is known, the degree of parallelism determines the appropriate clock frequency, f$_s$, for the systolic array(s). That is, for any degree of parallelism, $2^{k+c}$, the appropriate systolic array clock frequency is given by f$_s$=f$_r$/$2^{k+c}$, so that $2^{k+c}$ MSB's are generated each cycle of the array clock, f$_s$. Note that if ΔT and Δt are the periods associated with frequencys f$_s$ and f$_r$, respectively, then ΔT=(Δt)$2^{k+c}$.

As illustrated in FIG. 4, the time dependent input variables X, and Y, are summed in time staggered, pipelined fashion, starting with their least significant bits (LSB's), so the summers 56b$_0$–56b$_{19}$ provide place value sum bits N$_j$ plus carry bits for sum, N, of the variables X and Y. Due to the place value dependent input delay registers 57b$_1$–57b$_{19}$, any selected bit N$_{T(j)}$ of a given sum word N$_T$ is (1) produced one clock period after ($-\Delta T$) the next less significant bit (NLSB), $N_{T(j-1)}$, and (2) one clock period before ($+\Delta T$) the next more significant bit (NMSB), $N_{T(j+1)}$. Thus, at any given time, the R-bit long summer $56b_0$–$56b_{19}$ contains the sum results (sum bits and carry bits) for bits occupying successive place value positions within R consecutive words, which represent the sum values, $N_T$, $N_{T+\Delta T}$, $N_{T+2\Delta T}$... , respectively, of R consecutive coincidental values of the input variables X and Y. In this conventional pipelined fashion, $N_T$, $N_{T+\Delta T}$, $N_{T+2\Delta T}$... are produced in R clocks, but their production overlaps so that the results of $N_T$, $N_{T+\Delta T}$, $N_{T+2\Delta T}$... are available one clock apart.

The bits of each input word, N, are clocked in place value sequence from the input sumemrs $56b_0$–$56b_{19}$ to a mode control logic 58. The mode control logic 58 suitably comprises means for supplying (1) a R bit long interleave factor having a value of $2^cN$, (2) an R bit long interleave offset having values of $-pN$, where p is a systolic array index composed of consecutive counting numbers ranging from 0 to $2^c-1$ to provide a unique index number for each array that is used, and (3) an R bit long accumulation factor having a value of $2^{k+c}N$.

As shown, the interleave factor and the interleave offset are routed to the interleave plane 53, while the accumulation factor is routed to an R bit long accumulator $50b_0$–$50b_{19}$ to cause it to generate a R bit long word having a value Accm. It, however, should be reemphasized that all of these values for any given $N_T$ exist spatially diagonally while they are propagating vertically upwardly through the array 52, so that all right-to-left carries from any given bit to its NMSB are performed during a single clock. The third dimension, from the interleave plane 53 to the subaccumulator plane 54, allows the results of all computations performed within the interleave plane 53 on any given clock to be transferred in parallel to the subaccumulator plane 54 on the very next clock, as more fully described hereinbelow.

Figure 5:
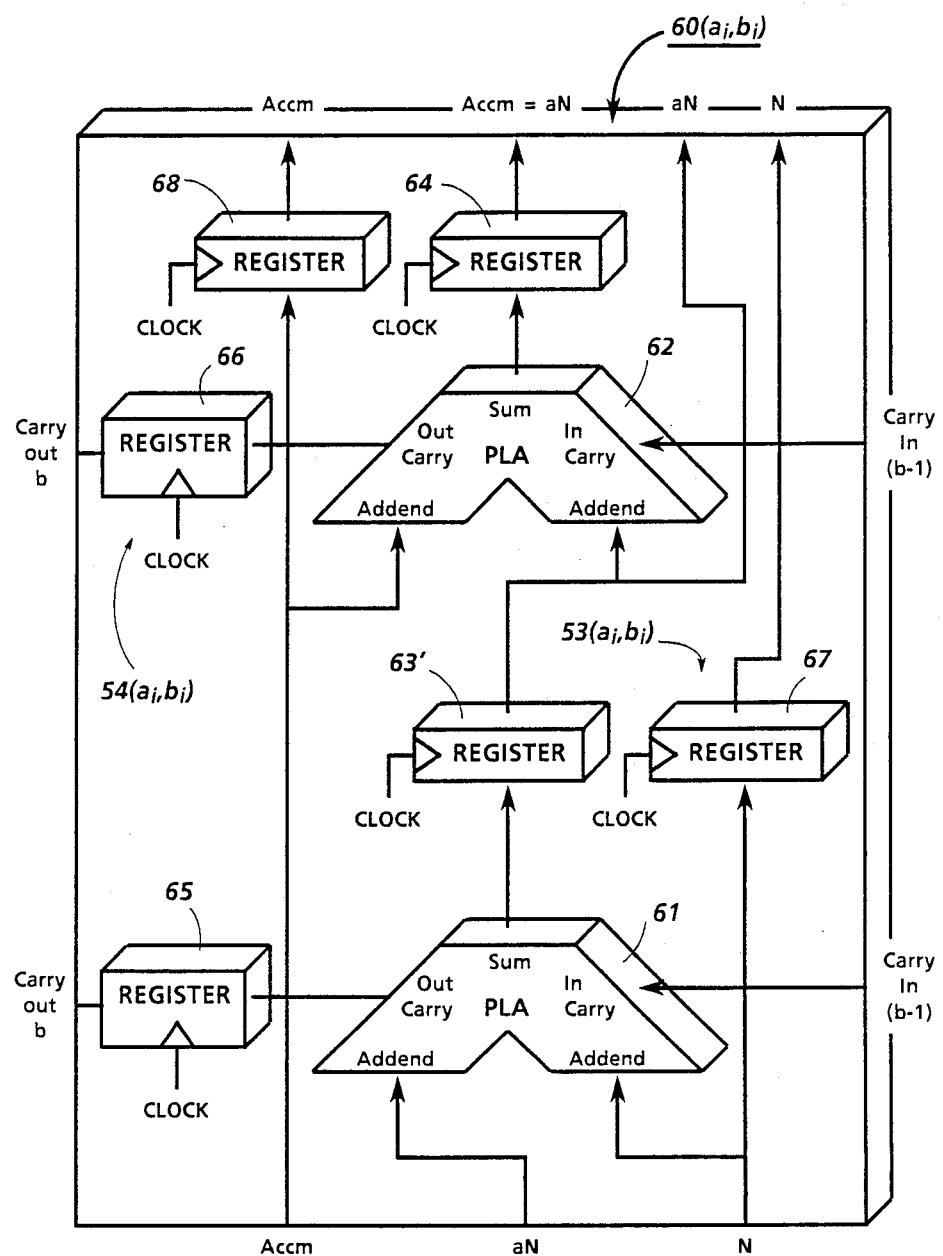
FIG. 5 is a functionals block diagram illustrating a representative one of the cells of the systolic array shown in FIG. 4 in further detail.
Figure 6A:
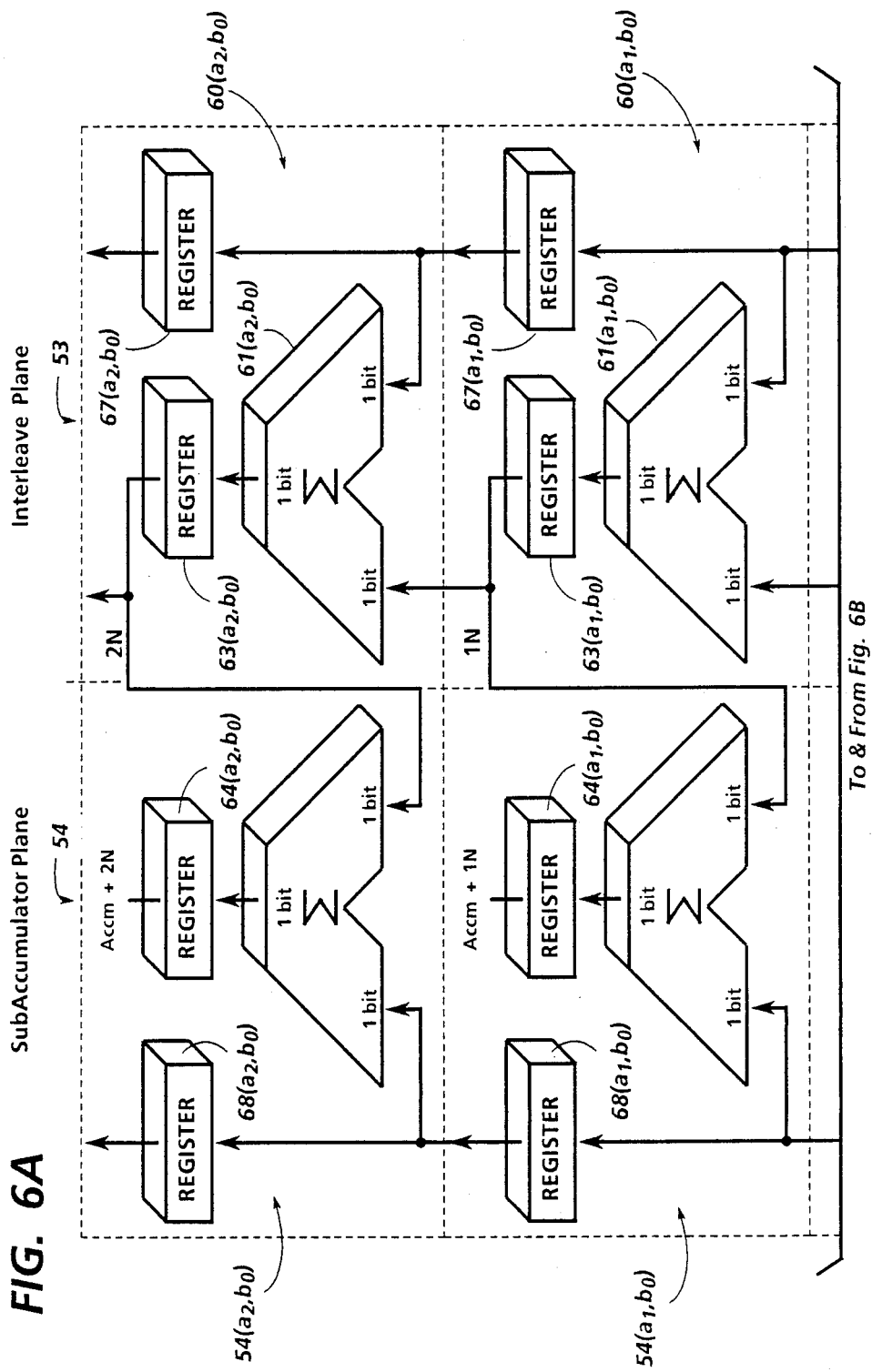
FIG. 6 is a block diagram illustrating the data flow within the systolic array shown in FIG. 4 in further detail.
Figure 6B:
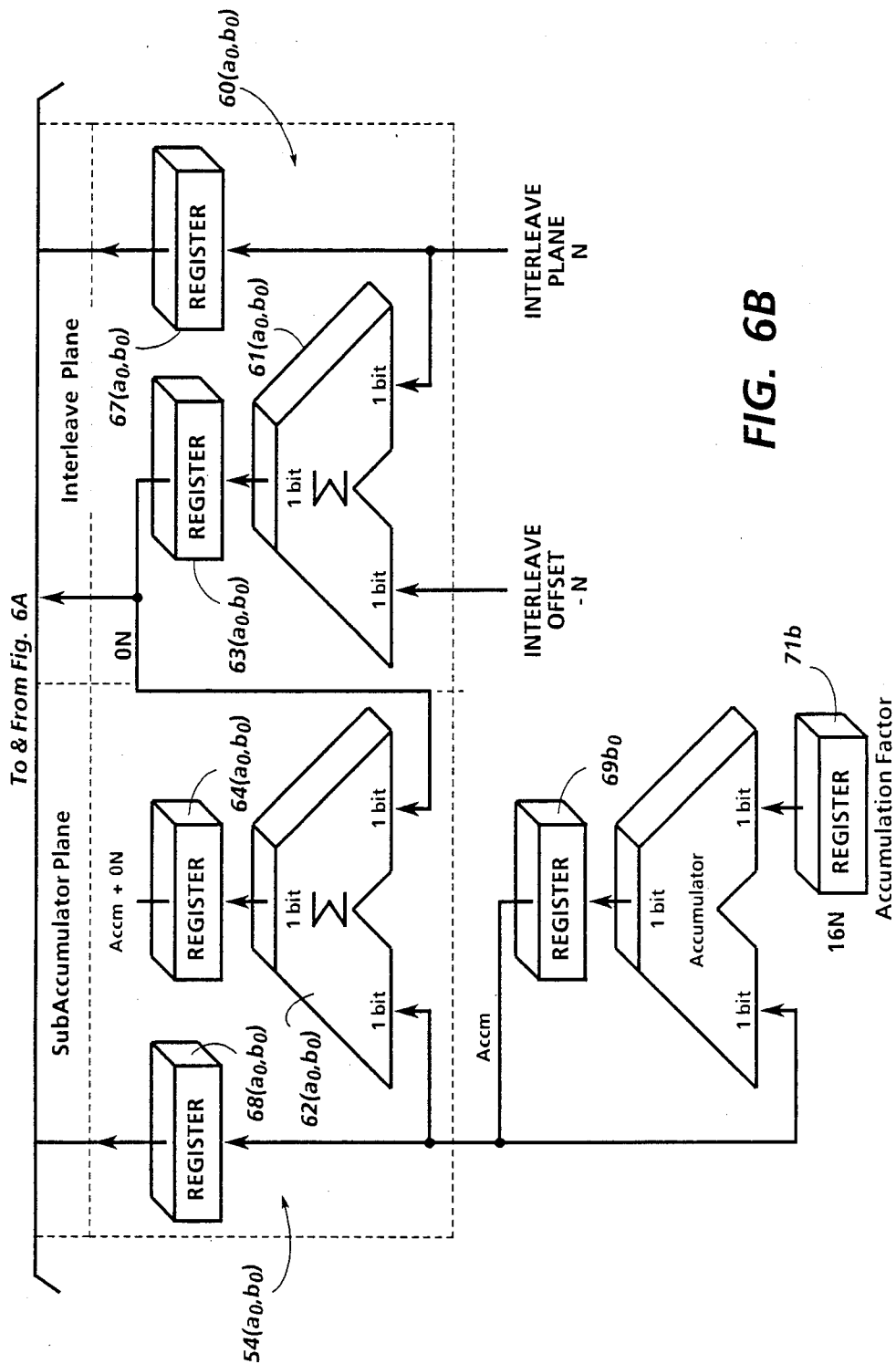

Turning now to FIGS. 5 and 6, a single array frequency synthesizer 51 (FIG. 7) employs N at its interleave factor, $-N$ as its interleave offset, and $2^kN$ as its accumulation factor. As shown in FIG. 5, each cell $60(a_i, b_j)$ of the systolic array 52 includes an interleave subcell $53(a_i, b_j)$ and a subaccumulator subcell $54(a_i, b_j)$, which are identical in construction (except for interconnections) and which can be implemented as mirror images of one another with standard NMOS technology. More particularly, the subcells $53(a_i, b_j)$ and $54(a_i, b_j)$ include full adders 61 and 62, output registers 63 and 64, output carry registers 65 and 66, and delay registers 67 and 68, respectively, all of which can be implemented by providing separate programmable logic arrays (PLA's) for the subcells $53(a_i, b_j)$ and $54(a_i, b_j)$.

If it is assumed that a selected bit $N_{T(j)}$ of an input word, $N_T$, has reached the interleave subcell $53(a_i,b_j)$ for processing, it is evident that (1) a carry-in bit is available at the PLA 61 for the processing of $N_{T(j)}$ due to the one systolic clock period prior ($-\Delta T$) processing of the NLSB, $N_{T(j-1)}$), by the right-hand adjacent interleave subcell, and (2) a carry-ou bit is fed from the PLA 61 to the register 65 to be passed one systolic clock period later ($+\Delta T$) to the left-hand adjacent interleave subcell for the processing of the NMSB, $N_{T(j+1)}$. A similar timing relationship governs the carry-in and the carry-out to and from, respectively, the subaccumulator PLA 62, but the operation of the subaccumulator PLA 62 will be clearer after the transfer of data from the interleave plane 53 to the subaccumulator plane 54 is better understood.

Referring to FIG. 6 a constant "b" slice has been taken along the vertical dimension of the array 52 to illustrate the interleave plane 53 to subaccumulator plane 54 data paths for the three systolic cells $60(a_0, b_0)$, $60(a_1, b_0)$ and $60(a_2, b_0)$ at the lower right-hand of the array 52. All carries flow into and out of the plane of FIG. 6, so that they are not shown. In the interest of consistancy of notation, it is assumed that at the time, $T_0$, interleave subcell $53(a_0,b_0)$ of the systolic cell $60(a_0,b_0)$ is prepared to process the LSB, $N_{T(0)}$, of the given word $N_T$, so the interleave factor and the interleave offset are indicated as being $N_{T(0)}$ and $-N_{T(0)}$, respectively. As will be understood, $-N_T$ is the two's complement of $N_T$, so it is obtained by inverting $N_T$ with the mode control logic 58 (FIG. 4) and by then applying the inverted result to the interleave subcell $53(a_0, b_0)$ while holding the carry input for that subcell at a high ("1") logic level (viz., $N_T+1=-N_T$). The carry inputs for all of the other subcells shown in FIG. 6 are grounded ("0"), so the LSB's of the input words propogate through the array 52, without being affected by extraneous impact carries.

At time $T_0$, $N_{T(0)}$ and $-N_{T(0)}$ are applied to respective inputs of the interleave adder $61(a_0, b_0)$, so they are summed to load $0N_{T(0)}$ ("0" due to the two's complemented relationship of the interleave factor $N_{T(0)}$ and the interleave offset $-N_{T(0)}$) into the interleave output register $63(a_0, b_0)$. In response to the very next clock ($T_0+\Delta T$), $0N_{T(0)}$ is fed (1) to an input of the next following or second row interleave adder $61(a_1, b_0)$, and (2) to an input of the corresponding subaccumulator adder $62(a_0, b_0)$. At that same time, $T_0+\Delta T$, the interleave delay register $67(a_0, b_0)$ feeds the interleave factor, $N_{T(0)}$, to the other input of the second row interleave adder $61(a_1, b_0)$, thereby causing it to load $1N_{T(0)}$ into its output register $63(a_1, b_0)$. Accordingly, it will be understood that the interleave factor $N_{T(0)}$ propogates upwardly through the interleave plane 53, thereby causing the interleave output registers $63(a_0, b_0)$ ... $63(a_{15}, b_0)$ to output $0N_{T(0)}$ ... $15N_{T(0)}$, respectively, for transfer to the subaccumulator plane 54 on successive clocks ($T_0+\Delta T$ ... $T_0+15\Delta T$).

Transferring $0N_{T(0)}$ to the subaccumulator plane 54 causes it to sum in the adder $62(a_0, b_0)$ with the output $Accm_{T(0)}$ of an accumulator cell $60b_0$. As a result of the initialization process, the value Accm accumulated by the accumulator $60b_0$–$60b_{19}$ (FIG. 4) is initially zero, but an any other time it may be an offset value $Accm_T$. At time $T_0$, the mode control logic 58 outputs an accumulation factor $16N_{T(0)}$ for the accumulator $69b_0$, but there is a delay register $71b_0$ at the input of the accumulator $69b_0$ for delaying the arrival of the accumulation factor $16N_{T(0)}$ by one clock, $\Delta T$. That provides the lead time that is needed for $Accm_{T(0)}$ to propogate upwardly through the delay registers $68(a_0, b_0)$–$68(a_{15}, b_0)$, thereby causing the subaccumulator output registers $64(a_0, b_0)$–$64(a_{15}, b_0)$ to output $0N_{T(0)}+Accm_{T(0)}$ through $15N_{T(0)}+Accm_{T(0)}$, respectively, at successive times $T_o+2\Delta T$ through $T_o+17\Delta T$. At time $T_o+2\Delta T$, the output register $72b_0$ of the accumulator $69b_0$ is clocked, thereby incrementally increasing $Accm_{T_o}$ by the accumulation factor $16N_{T(0)}$, so the subaccumulator registers $64(a_0, b_0)$–$64(a_{15}, b_0)$ then output $16N_{T(0)}+Accm_{T(0)}$ through $31N_{T(0)}+Accm_{T(0)}$ at times $T+3\Delta T$ through $T+18\Delta T$, respectively, assuming the value $N_T$ remains constant. Thus, it will be understood that the process is repeated at the array clock $f_s$ frequency, to cause the subaccumulator output registers $64(a_0, b_0)$–$64(a_{15}, b_0)$ to operate in parallel to produce successive multiples of $N_{T(0)}$ for all counting numbers until the value of the input word, N, is changed. The input resolution of the systolic array 52 (FIG. 4) is limited by its clock frequency, $f_s$, so at least $2^{k+c}$ consecutive integer multiples of any given word, $N_T$, are computed before the value of the next word has any effect on the MSB's appearing at the output of the array 52. Moreover, it will be apparent that any accumulator offset value Accm that may exist at the outset of the processing of any particular input word is simply a fixed reference for the counting number multiples that are generated in response to that word, so it determines (and may be increased or decreased to control) the phase relationship of the MSB's generated in response to successive input words.

While only the MSB's from the outputs of the subaccumulator subcells, $54(a_{19}, b_0)$–$54(a_{19}, b_{15})$ are used to provide a synthesized frequency, the foregoing discussion demonstrates the process that is involved in generating those MSB's. In the interest of completeness, however, the subaccumulator plane carry in/carry out function will be briefly reviewed. Returning to FIG. 4 for that purpose, it will be seen that the "carry in" for the subaccumulator adder $61(a_i, b_j)$ comes from the right-hand adjacent subaccumulator subcell $54(a_{i-1}, b_j)$ without delay and that its "carry out" is fed through the carry register $66(a_i, b_j)$ to the left-hand adjacent subaccumulator subcell $54(a_{i+1}, b_j)$ after a one clock delay, $\Delta T$. Thus, whenever a bit $N_{T(j)}$ arrives at the adder $61(a_i, b_j)$, an appropriate input carry is available as a result of the adjacent processing during the prior clock, $(-\Delta T)$ of the NLSB, $N_{T(j-1)}$, and an output carry from the adder 61 is provided on the next clock $(+\Delta T)$ for the processing of the NMSB. There are no output carries from the MSB subaccumulator subcells $54(a_{19}, b_{15})$, sono propogation time is allotted to them.

There are no output carries from the subaccumulator subcells $54(a_0, b_{19})$–$54(a_{15}, b_{19})$ for the MSB's, so no propagation time is allotted to them. There is, however, an incremental delay of one systolic clock period, $\Delta T$, which time staggers the computation of the MSB's for the successive counting number multiples of any given input word, $N_T$. With each group of $2^k$ successive multiples of $N_T$, this incremental delay is attributable to the additional propagation delay, $\Delta_T$, that is required for bits to propogate upwardly through the array 54 from one level to the next. In other words, the path length for the MSB's computed within each of the upper subaccumulator subcells $54(a_1, b_{19})$–$54(a_{15}, b_{19})$ is one systolic clock period, $\Delta T$, longer than the path length for the MSB's computed within the next lower subaccumulator subcells $54(a_0, b_{19})$–$54(a_{15}, b_{18})$, respectively. Thus, to time destagger each group of $2^k$ MSB's, the lower level MSB subaccumulator subcells $54(a_0, b_{19})$–$54(a_{14}, b_{19})$, are coupled to output drives $71a_0$–$71a_{14}$ via path length equalizing, variable length delay registers $72a_0$–$72a_{14}$, while the uppermost MSB subaccumulator subcell $54(a_{15}, b_{19})$ is directly coupled to its output driver $71a_{15}$. As a result, all of the MSB's for each group of $2^k$ successive multiples of $N_T$ are simultaneously applied in parallel to the output drivers $71a_0$–$71a_{15}$. One systolic clock period later $(+\Delta T)$, the output drivers $71a_0$–$71a_{15}$ receive the MSB's for another group of $2^k$ multiples of a new input word, $N_{T+\Delta T}$.

Figure 7:
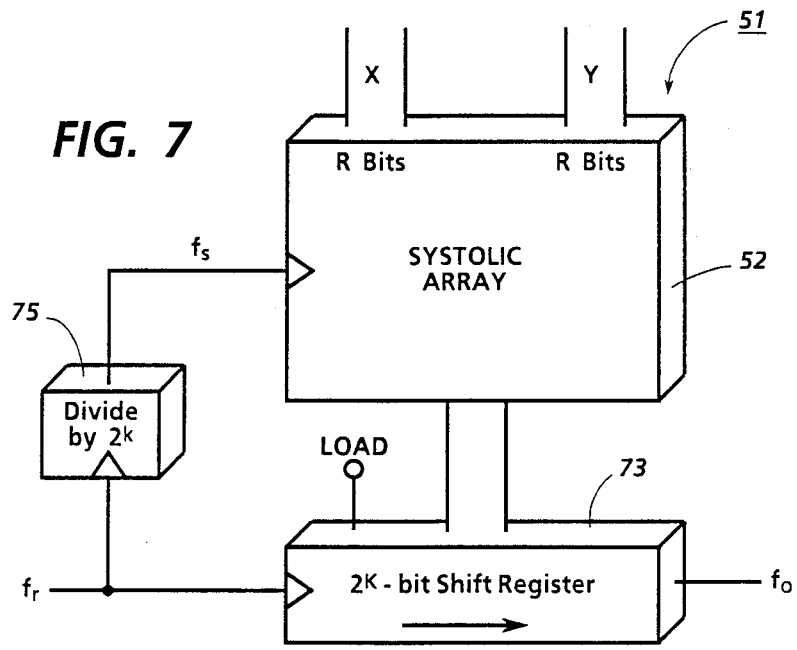
FIG. 7 is a schematic diagram illustrating a single array embodiment of an arithmetic frequency synthesizer constructed in accordance with this invention.

Turning now to FIG. 7, it will be seen that the drivers $71a_0$–$71a_{15}$ load each group of $2^k$ multiples of $N_T$, $N_{T+1}$... in parallel into a $2^k$ bit long shift register 73 in response to a load signal which is applied to the shift register 73 one reference clock period, $\Delta T$, before the next group of MSB's reach the drivers $71a_0$–$71a_{15}$. Those MSB's are serially clocked out of the register 73 at the reference clock frequency, $f_r$, and the process is then repeated for the next group of $2_k$ MSB's, thereby providing an arithmatically synthesized output frequency in accordance with equation (2). The array clock, $f_s$, suitably is derived from the reference clock, $f_r$, by a divide by $2^k$ divider 75.

Figure 8:
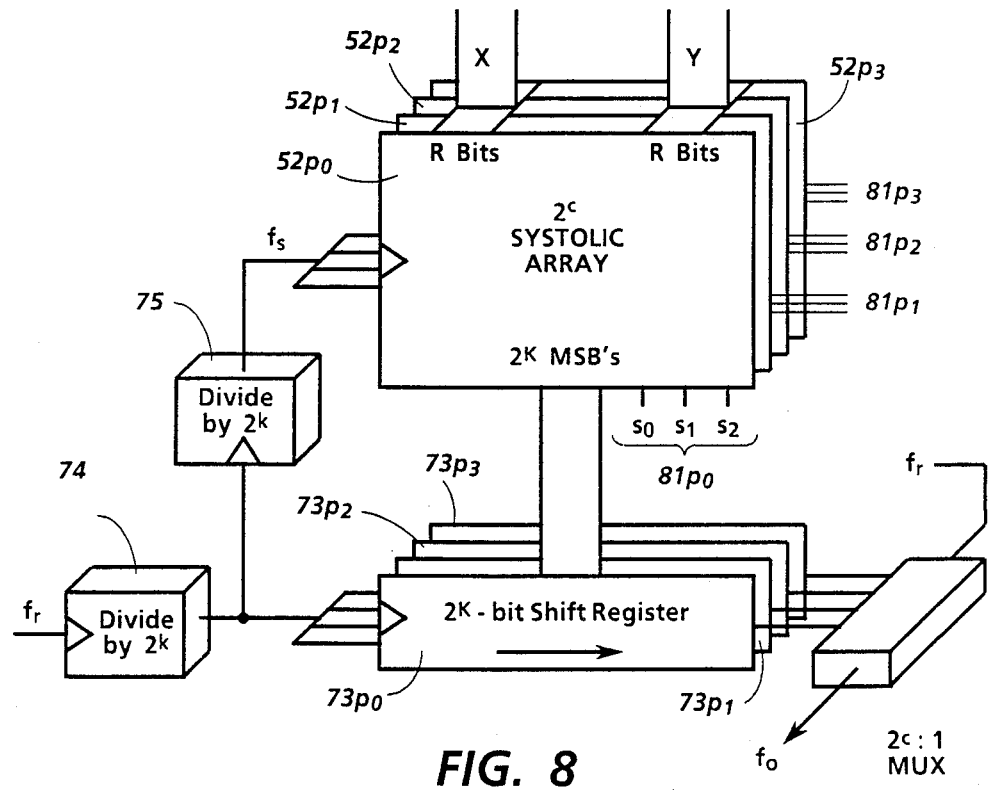
FIG. 8 is a schematic diagram showing a multiple array configuration for the arithmetic frequency synthesizer of the present invention.

Known higher density VLI technologies, such as NMS technology, are speed limited. However, they are economically attractive and are compatible with the device density that is required to integrate a reasonably large systolic array 52 on a standard size VLSI chip. Thus as shown in FIG. 8, parallel arrays $52p_0$–$52p_3$ and parallel output registers $73p_0$–$73p_3$ are provided for arithmetically synthesizer higher frequencies. As will be recalled, a parallelism factor "c" was previously introduced to generalize the description sufficiently to account for the parallelism of the arrays $52p_0$–$52p_3$. It should be noted, however, that the interleave offsets for the arrays $52p_0$–$52p_3$ are $-0N$, $-1N$, ... $(2^{c-1})N$, respectively, and are preset under the control of the control words applied to the state or mode control lines s0, s1, s2 (FIG. 4), which are collectively identified in FIG. 8 by $81p_0$–$81p_3$ (only the mode control lines $81p_0$ for the array $52p_0$ are shown in detail). As a result, the arrays compute $2^{k+c}$ consecutive integer multiples of N/cycle of the systolic clock, $f_s$. Moreover, the MSB's for the consecutive multiples of N are distributed in order across level after level of the arrays $52p_0$–$52p_3$.

The clock frequencies for the arrays $52p_0$–$52p_3$ and the shift registers $73p_0$–$73p_3$ bear the same relationship to each other and need be no higher than the corresponding clocks for the above-described single chip embodiment. The reference clock frequency, $f_r$, however, may increase by a factor as large as $2^c$. To accommodate the higher reference frequency, $f_r$, there are two serially connected frequency dividers 74 and 75 for sequentially dividing the reference frequency, $f_r$, by $2^c$ and $2^k$ to provide the clock for the registers $73p_0$–$73p_3$ and the clock for the arrays $52p_0$–$52p_3$, respectively.

Each group of $2^{k+c}$ MSB's computed by the arrays $52p_0$–$52p_3$ are simultaneously loaded into the shift registers $73p_0$–$73p_3$, and they are shifted out of the registers $73p_0$–$73p_3$ in parallel subgroups, each of which contains $2^c$ MSB's for consecutive integer multiples of N. Therefore, the outputs of the registers $73p_0$–$73p_3$ are coupled to a $2^c:1$ multiplexer 76 which is driven at the reference frequency, $f_r$, to serialize the MSB's, thereby causing them to arithmetically synthesize a frequency in accordance with equation (2).

In view of the foregoing, it will be understood that the parallel/pipelined arithmetic frequency synthesizer of the present invention provides linear frequency resolution over an extremely broad band of frequencies. Furthermore, it will be evident that the synthesizer is compatible with existing VLSI circuit technologies.

What is claimed is:

1. An arithmetic frequency synthesizer comprising the combination of
   array means for cyclically and recursively accumulating a predetermined number of consecutive integer multiples of a R-bit long binary word having a time dependent value N; where $R>1$ and N is within the range $-2^{R-1} \leq N < 2^{R-1}$, whereby said array means accumulates said predetermined number of binary values during each cycle, with each of said accumulated values having a most significant bit;

register means;

means coupled between said array means and said register means for loading the most significant bits of the binary values accumulated by said array means during each cycle into said register means in parallel; and clock means coupled to said register means for serially shifting said most significant bits out of said register means in accumulated order, thereby serializing said bits to synthesize a frequency which varies as a function of N.

2. An arithmetic frequency synthesizer of claim 1 wherein said array means recursively accumulates $2^{k+c}$ multiples of said word during each of said cycles, where k is an integer number representing the number of R-bit long subaccumulators pe array stage in base 2 exponential notation and c is the base 2 log of the number of array stages;

said array means is clocked at a frequency $f_s$ to accumulate said binary values; and said clock means clocks said register means at a frequency $f_r$ to serialize said most significant bist, where $f_r = f_s/2^{k+c}$.

3. An arithmetic frequency synthesizer of claim 2 wherein said array means is a single stage array, such that c equals 0.

4. An arithmetic frequency synthesizer of claim 2 wherein said array means comprises a plurality of array stages which accumulate said binary values in time staggered relationship with an accumulation time offset of $\Delta T$ from one array to the next, where $\Delta T$ is the period of the frequency $f_s$.

5. An arithmetic frequency synthesizer of claim 1 wherein the bits of said multiples are applied to said array means in increasing place value order on successive cycles of said frequency $f_s$, whereby said binary values are accumulated systolically.

* * * * *